| United States Patent [19] | [11] Patent Number: | 4,548,967 |
|---|---|---|
| Brown et al. | [45] Date of Patent: | Oct. 22, 1985 |

[54] MASKING AGENT FOR PAINT SPRAY BOOTHS

[75] Inventors: William B. Brown; Cynthia E. Davis, both of Naperville, Ill.

[73] Assignee: Nalco Chemical Company, Oak Brook, Ill.

[21] Appl. No.: 621,299

[22] Filed: Jun. 15, 1984

Related U.S. Application Data

[63] Continuation-in-part of Ser. No. 602,239, Apr. 19, 1984, abandoned.

[51] Int. Cl.$^4$ ............................ C08L 5/00; C08K 5/15
[52] U.S. Cl. .......................................... 524/56; 524/58; 524/905; 427/154; 427/259; 134/4; 134/22.19; 134/38
[58] Field of Search ................ 524/56, 58, 27, 35, 524/47, 905, 57; 427/259, 154, 420; 264/300, 304; 134/4, 22.19, 38

[56] References Cited

U.S. PATENT DOCUMENTS

| | | | |
|---|---|---|---|
| 2,877,131 | 3/1959 | Overholt et al. | 134/4 |
| 3,846,172 | 11/1974 | Fossati | 134/4 |
| 3,922,462 | 11/1975 | Katz et al. | 428/290 |
| 4,053,666 | 10/1977 | Taylor et al. | 134/38 |
| 4,085,059 | 4/1978 | Smith et al. | 134/38 |
| 4,184,881 | 1/1980 | Bradley | 427/421 |

Primary Examiner—John Kight
Assistant Examiner—Nathan M. Nutter
Attorney, Agent, or Firm—John G. Premo; Donald G. Epple

[57] ABSTRACT

A paint spray booth masking composition comprising:

| Ingredients | % by weight |
|---|---|
| Water | 30–50 |
| Polyvinylpyrrolidone | 2–30 |
| Saccharide | 16–60 |
| Water-soluble surfactant | 0.07–0.13 |
| Preservative | 0.05–0.10 |
| Water-soluble plasticizer | 0–10 |

6 Claims, No Drawings

MASKING AGENT FOR PAINT SPRAY BOOTHS

This application is a continuation-in-part of copending Ser. No. 602,239 filed Apr. 19, 1984 and now abandoned.

INTRODUCTION

Paint spray booths are used by the automotive industry and by large equipment manufacturers to spray automotive bodies and other metal surfaced products.

In the process of spraying such articles, overspray tends to coat the interior surfaces of the booths with a layer of either tacky or dried paint. Present practice is to remove accumulated overspray paint from the interior walls and surfaces of these booths using solvents such as methylene chloride. There is a definite trend in the use of paint spray booths to avoid using volatile organic solvents to clean the interior surfaces of these booths because of health hazards and costs.

One solution to cleaning overspray from the interior surfaces of paint spray booths is to coat the interior of a clean booth with a water-soluble masking agent which provides an adherent coating to the interior surfaces of the booth which, when subsequently coated with paint, allows the paint to be easily removed by water washing.

To be effective, a masking agent for paint spray booths must be water-soluble or dispersible, must be capable of adhering to a variety of solid surfaces such as metals, glass, and paint in various forms of dryness. Further, such coatings must be capable of being applied by simple means such as spraying. Such coatings would also be effective masking agents for other oil based systems including for example the protection of surfaces from machining and coating oils.

THE INVENTION

This invention consists of a composition consisting of a low molecular weight polyvinylpyrrolidone blended with a water solution of dextrose which will dry to produce a dry, transparent coating on glass and metal substrates. This coating is used to protect the substrate from paint overspray which would stick to interior surfaces in the spray booth. This coating will maintain visibility through the booth while providing a water-soluble coating which collects the overspray and can be washed from the surfaces along with any paint overspray which contacted it. Surfactants are often times required to assist in wetting the glass to form a continuous coating, and an antimicrobial agent is optionally required to prevent baterial degradation of the composition during storage.

For a better understanding of the invention, reference may be had to the general and preferred compositions of the invention which are set forth below:

| Ingredients | % by weight General | % by weight Preferred |
| --- | --- | --- |
| Water or aqueous solvent | 30–50 | 40–46 |
| Polyvinylpyrrolidone | 2–30 | 8–12 |
| Saccharide | 16–60 | 32–41 |
| Water-soluble plasticizer | 0–10 | 3–7 |

The above compositions should be formulated to produce a viscosity of at least 20 centipoise with a preferred range being 20–30 centipoise. This allows the compositions to be applied using conventional paint spray equipment. If the formulas are thinner, they tend to run.

In some cases it is advantageous to formulate the masking composition of this invention using low biocide water miscible solvent such as ethanol or isopropanol to facilitate drying of the composition. Such solvents can be merely substituted for all or part of the water contained in the composition.

The composition of this invention may also include a water-soluble surfactant at a level of from 0–0.75% and preferably 0.01–0.5% of the composition. The surfactant when employed is necessary to allow adhesion of the coating to surfaces other than glass. A water-dispersible antimicrobial agent may also be added to the composition to prevent bacterial growth. The antimicrobial agent, when employed is generally added at levels of from 0–1% and preferably 0.05–0.1% by weight of the composition.

The Polyvinylpyrrolidone

The polyvinylpyrrolidone used in the practice of the invention should have a molecular weight less than 50,000 grams/mole. A preferred polyvinylpyrrolidone is one having a gram molecular weight within the range of 5,000–20,000 and, preferably, a molecular weight of 10,000. For a more comprehensive discussion of polyvinylpyrrolidone, reference may be had to Chapter 21 of the *Handbook of Water-Soluble Gums and Resins* by Robert L. Davidson, McGraw-Hill, Inc., 1980.

The Saccharides

The saccharide used in the invention may be a monosaccharide or disaccharide such as sucrose, glucose, or fructose. In addition to using the simple monosaccharide the so-called polysaccharides may also be used. A convenient form of saccharides and/or polysaccharides that can be used to prepare the compositions of the invention are the commercially available corn syrups. A typical syrup of this type is sold under the trade name of Karo Light Corn Syrup. It has the following composition:

| Component | In 100 Grams |
| --- | --- |
| Weight (grams) | 100.0 |
| Moisture (grams) | 26.5 |
| Protein (N × 6.25) (grams) | None |
| Fat (grams) | None |
| Carbohydrate, Total (grams) | 72.8 |
| Levulose (grams) | 1.9 |
| Dextrose (grams) | 19.1 |
| Maltose (grams) | 9.3 |
| Trisaccharides (grams) | 7.6 |
| Other Polysaccharides (grams) | 34.9 |

For a more detailed description of saccharides and polysaccharides, see the *Textbook of Organic Chemistry*, by Fieser & Fieser, Chapter 14, D. C. Health and Company, Boston, 1950.

The Water-Soluble Surfactant

A large number of anionic or nonionic water-soluble surfactants can be used in preparing the compositions of the invention. A detailed description of such surfactants are found in McCutcheon's *Detergents & Emulsifiers*, 1984 North American Edition, Published by McCutcheon's Division, Allured Publishing Corp, Ridgewood, N.J. The surfactants used should be compatible with the finished compositions from the standpoint that they should not produce cloudiness in the formulation and should not tend to precipitate any of the other ingredients. The nonionic surfactants are preferred with a most preferred group being the water-dispersible or water-soluble ethylene oxide adducts of 2,4,7,9-tetra-methyl-5-decyne-4,7-diol. A preferred material is the above acetylenic alcohol reacted with 10 moles of ethylene oxide sold under the name, Surfynol 465. Another preferred surfactant is Triton DF16, a modified polyethoxylated straight chain alcohol.

As stated earlier the surfactant component is useful when the coating is applied to surfaces other than glass. For reasons not completely understood satisfactory adhesion is achieved on glass surface with or without the addition of surfactant. When applied to metal or most plastic surfaces however, the surface component of the composition appears to be necessary for adhering the coating to the surface.

The Preservative

The antimicrobial agent should be compatible with the formula and is preferably water-dispersible or water-soluble. Any number of antimicrobial agents known to the art may be used such as, for example, water-dispersible preparations of chlorinated phenols, methylene bis thiocyanate, and the like. A preferred antimicrobial agent is hexahydro-1,3,5-triethyl-s-triazine. This product is sold under the tradename, VANCIDE®TH, and is a registered trademark of R. T. Vanderbilt Company, Inc.

The Plasticizer

The final ingredient used to prepare the preferred compositions of the invention are the water-soluble or dispersible plasticizers. This ingredient, as previously indicated, is optional but is used to prevent cracking of the finished coatings under conditions of low humidity. Typical of such plasticizers are the water-soluble glycols and polyether glycols. A preferred material is diethylene glycol.

EXAMPLES

The coatings of this invention may be applied to the surface being masked by any conventional means including spraying, rolling, brushing, dipping, etc. The coating when applied adheres to the surface to which they have been applied and forms a coating which is readily washable using only water. The coating even after drying on the surface will contain 5–15% water.

To illustrate the example the following examples are presented.

While these examples deal primarily with the use of coatings of this invention in paint spray booths, it should be pointed out that the coatings have greater applications including surface protection from oils, etc. and metal machining operations, the protection of painted parts during shipment, and any other applications where it would be desirable to protect a surface from contact with a hydrocarbon based material.

EXAMPLE 1

In this example, the particular composition used had the following composition:

| Ingredients | % by weight |
| --- | --- |
| Tap water | 44.85 |
| Triton DF16 | 0.10 |

-continued

| Ingredients | % by weight |
| --- | --- |
| Vancide ® TH | 0.05 |
| Polyvinylpyrrolidone K-15 | 10.0 |
| Corn Syrup Grade 1132 | 45.0 |

Paint Spray Booth Design

The booth was a center-draft, designed by Flakt. The booth consisted of a single wall of windows, with a solid wall on the opposite side. The oversprayed paint is drawn down through the grates and into the water in the pan. The flow of air from the overhead filters, through the grating and into the spinners allows washing of the air as it passes through the spinners and into the exhaust stacks. In the areas of the booth where the electrostatic Turbobells ® are located, a control panel is located on the outside of the booth. Good visibility is needed by the operator to keep the bells operating properly.

Testing Procedure

On arrival, the booth had been completely cleaned, and a commercial white booth masking had been applied to the walls. The windows were protected from the white masking with sheets of Plexiglas ® cut to fit the window openings. A final cleaning with a solvent was needed to remove the last traces of oil from the glass.

The masking was applied with a cup gun with atomizing air pressure set at 40 psi. A wide fan was established with full atomization of the masking.

Windows were coated in both the areas containing the electrostatic bells and in areas with manually applied paint. The transparent masking was also applied to sections of clean walls and on the floor grates in certain areas.

Results

The masking was applied in a smooth layer between ½ and 1 mil, as measured with a wet film gage. Although the coating was applied smooth, it began to sag within ten minutes. Drying time was in excess of 30 minutes. The dry coating was somewhat hazy, and the operators of the electrostatic bells complained of lack of visibility through the booth windows.

Application time for single windows of 25 ft.$^2$ was three minutes. Coverage, with the booth air on, was about 300 ft.$^2$ per gallon. Improvement in application should give 450 ft.$^2$ per gallon at 1 mil wet film thickness.

It was later found that these spray booths were humidified to 75% RH to ensure proper application of the paint. This was determined to be the cause of the film sagging and of the excessive drying time. On the second day, the booth humidity was dropped to 45% RH, and the coating dried within 10 minutes with no sagging.

Removal was quick, with only a slow stream of water necessary to completely remove the masking along with the light overspray in the manual spray areas.

EXAMPLE 2

In another test, the identical formula was tested in another paint spray booth. The results are set forth below:

Plant Layout

The booth was designed and installed by Otto Durr Co. It was a center draft booth, with the central air scrubbing slot supplemented by additional baffling to remove paint solids from the vented air.

Water from the booth was sent to the sludge treatment area which had recently been significantly changed to conserve energy. The Wemco and DAF flotation units had been shut down and dismantled. This resulted in a much higher solids loading in the water since floated solids were not being removed from the system.

The booth water was being treated with a silicate detackifier. The paint used was a high solids truck enamel used on small trucks. A methylene chloride paint stripper was being used on a daily basis to remove paint overspray from windows, walls and floor grates in the booth. This stripper also contributes to problems with tacky paint.

Detackified paint coming into contact with stripper becomes retackified and agglomerates into larger lumps of paint. This, in conjunction with paint removed from the booth, are removed by Roto-Strainers ® in the system. The aggregates of tacky paint are carried by a conveyor belt into a gondola for disposal. The area under the belt accumulates masses of semi-solid paint waste that eventually bind up the conveyor system and breaks the drive chain. Manual cleaning is required to remove the large build-up of paint waste.

The use of masking materials was suggested as a method of eliminating or minimizing the use of paint strippers in the paint spray booth.

Test Procedure

The booths were completely cleaned with methylene chloride stripper and hosed down with a 2" fire hose. The grates were cleaned with a high pressure blaster. After drying, the windows were cleaned with solvent and dried. The glass was etched due to use of the paint stripper and could not be cleaned completely.

The booth masking was sprayed from a siphon cup gun at ½ to 1 mil coating thickness, as measured with a wet film thickness gage. Drying time was measured until the coating was tack-free. The humidity was also measured.

After a single shift, the masking was removed with cold water. A significant amount of overspray was on the windows and on the painted walls adjacent to the windows. The windows were cleaned and the masking reapplied.

Results

The masking was easily applied with a cup gun. Where the thickness of the wet coating exceeded 1 mil, it began sagging after about five minutes. This was apparently due to the high humidity, which measured at 71% RH at 65° F. The coating remained clear. Drying time was measured at 45 minutes.

After drying, the windows were more transparent than without masking. The etched glass was coated, allowing full visibility. In all, three 5'×5' windows were coated with masking. The masking dried to a hard transparent coating. One of these received a great deal of overspray but did not form a continuous coating. A slow stream of water from the hose dissolved the masking but left a scattering of paint particles behind. This served to point out that high pressure water is needed to remove all oversprayed paint.

The hoses had to be protected during applications of the masking because it was known that with flexing, the masking would flake off. A coating was also applied to the walls but did not coat out completely. Paint applied directly to the wall beneath a window did not wash off.

EXAMPLE 3

To correct some of the problems encountered in the use of the previous formulation, the following composition was used:

| Ingredients | % by weight |
| --- | --- |
| Tap Water | 43.85 |
| Surfynol 465 | 0.10 |
| Vancide ® TH | 0.05 |
| Diethylene glycol | 5.0 |
| Polyvinylpyrrolidone K-15 | 10.0 |
| Corn syrup Grade 1132 | 41.0 |
| | 100.0 |

Testing Procedure

Test panels of stainless steel, approximately 4 inches by 12 inches in size were half coated with dip applied lacquers, enamels, primers and waterborne topcoats. This was baked at the manufacturer's recommended temperature and allowed to cool. Half the coated and uncoated areas were protected from application of the masking compound.

The masking was applied to these test panels with a cup gun. Atomizing air pressure was maintained at 40 psi. A heavy fan was established with sufficient material applied to allow the coating to flow down the surface of the panel. The coating was observed to flow out and not form the sags noted in previous tests.

The masking was observed to uniformly coat both the steel and the painted surfaces. Wet film thickness was measured at one mils of coating thickness. Drying time was measured at 20 minutes. After drying, a mist coat of paint was applied to the masked and unmasked area of the test panels. After air drying, a light stream of warm water was used to wash off the masking along with the paint overspray. The oversprayed paint was completely removed in the areas protected by the masking. None of the paint was removed in the unmasked areas.

EXAMPLE 4

Further testing was also performed using the same formulation.

Paint Delivery System

Paint used in the spray booth are delivered from the paint "kitchen" to the spray guns via a complex delivery system. Individual colors are mixed with line thinner and are pumped to the guns with a system of hoses. These hoses are connected to a manifold inside the spray booth, which allows a selection of color to the gun. Each color is transmitted to the gun connection via plastic hoses of various types. The most common are polyvinyl chloride and polyamide (flexible Nylon ®) types. These hoses are flexible, allowing movement of the gun during application of the paint.

Due to the flexing of these hoses and due to the need to move this bundle of hoses manually, several requirements must be met by a masking applied to these surfaces. The masking must be flexible enough to prevent flaking of the masking which could contaminate the surfaces being painted. The masking must also be dry enough to the touch not to transfer to the hands of the painters. The masking could be transferred from the hands to the parts being painted.

Test Procedure

Short lengths of tubing taken from a paint spray booth were coated with the masking by dipping and by brushing the coating on the surface. After drying, the material was washed off with warm water.

The masking was observed to coat the hose surfaces evenly. The masking did not pull back or bead up as had been observed with other formulations. Drying time was 20 minutes. The coating was dry to the touch and would not transfer to the hand. Flexing of the hoses produced cracking, but no flaking of the coating was observed.

The masking was completely removed with a warm water rinse.

Having thus described our invention, we claim:

1. A masking composition comprising:

| Ingredients | % by weight |
| --- | --- |
| Water | 30-50 |
| Polyvinylpyrrolidone | 2-30 |
| A saccharide, from the group consisting of monosaccharides, disaccharides, and corn syrup | 16-60 |
| Water-soluble plasticizer | 0-10 . |

2. A masking composition comprising:

| Ingredients | % by weight |
| --- | --- |
| Water | 40-46 |
| Polyvinylpyrrolidone | 8-12 |
| A saccharide, from the group consisting of monosaccharides, disaccharides, and corn syrup | 32-41 |
| Water-soluble surfactant | .01-0.75 |
| Water-soluble plasticizer | 3-7 . |

3. The composition of claim 2 where the water-soluble surfactant is a nonionic surfactant.

4. The composition of claim 2 where the water-soluble surfactant is an anionic surfactant.

5. A surface having been coated therewith with a composition comprising:

| Ingredients | % by weight |
| --- | --- |
| Water | 40-46 |
| Polyvinylpyrrolidone | 8-12 |
| A saccharide, from the group consisting of monosaccharides, disaccharides, and corn syrup | 32-41 |
| Water-soluble surfactant | .01-0.75 |
| Water-soluble plasticizer | 3-7 . |

6. A method for protecting surfaces of paint spray booths from the adherance of oil-based coatings which comprises coating such surfaces prior to the application of such oil-based coatings with a composition comprising:

| Ingredients | % by weight |
| --- | --- |
| Water | 40-46 |
| Polyvinylpyrrolidone | 8-12 |
| A saccharide, from the group consisting of monosaccharides, disaccharides, and corn syrup | 32-41 |
| Water-soluble surfactant | .01-0.75 |
| Water-soluble plasticizer | 3-7 . |

* * * * *